(12) United States Patent
Shreevastav et al.

(10) Patent No.: US 11,737,040 B2
(45) Date of Patent: Aug. 22, 2023

(54) SYSTEMS AND METHODS FOR OBTAINING TIMING ADVANCES

(71) Applicant: Telefonaktiebolaget LM Ericsson (publ), Stockholm (SE)

(72) Inventors: Ritesh Shreevastav, Upplands Väsby (SE); Sofia Brismar, Lidingö (SE); Andreas Höglund, Solna (SE); Yutao Sui, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 380 days.

(21) Appl. No.: 16/619,966

(22) PCT Filed: Aug. 8, 2018

(86) PCT No.: PCT/SE2018/050800
§ 371 (c)(1),
(2) Date: Dec. 6, 2019

(87) PCT Pub. No.: WO2019/032024
PCT Pub. Date: Feb. 14, 2019

(65) Prior Publication Data
US 2020/0205106 A1    Jun. 25, 2020

Related U.S. Application Data

(60) Provisional application No. 62/542,852, filed on Aug. 9, 2017.

(51) Int. Cl.
*H04W 56/00* (2009.01)
*H04W 76/11* (2018.01)
(Continued)

(52) U.S. Cl.
CPC ..... *H04W 56/0045* (2013.01); *H04W 68/005* (2013.01); *H04W 74/0833* (2013.01); *H04W 76/11* (2018.02); *H04W 76/27* (2018.02)

(58) Field of Classification Search
CPC . H04W 56/0045; H04W 76/11; H04W 76/27; H04W 68/005; H04W 74/0833;
(Continued)

(56) References Cited

U.S. PATENT DOCUMENTS

2014/0126460 A1* 5/2014 Bienas ............... H04W 74/002
370/315
2015/0271770 A1* 9/2015 Kwon ................ H04W 74/004
370/350
(Continued)

FOREIGN PATENT DOCUMENTS

WO    2018029643 A1    2/2018

OTHER PUBLICATIONS

Ericsson, "EC-GSM—Timing Advance Handling", 3GPP TSG GERAN Ad Hoc #1 on FS_IoT_LC, Sofia Antipolis, FR, Feb. 2, 2015, pp. 1-2, GPC150057, 3GPP.
(Continued)

*Primary Examiner* — Rushil P. Sampat
(74) *Attorney, Agent, or Firm* — Christopher & Weisberg, P.A.

(57) ABSTRACT

A method performed by a network node for establishing a connection for data transmission between the network node and the wireless device in a wireless communication network is provided. The network node establishes that the wireless device is fixed. Fixed comprises always being served by the same one or more access points. The network node obtains a Timing Advance (TA) for transmissions between the network node and the wireless device, based on the distance between the network node and the wireless device. The obtaining of the TA is performed without Uplink (UL) transmission. The network node sends an indication to the wireless device, which indication indicates the obtained TA. The network node then establishes a connection for data (Continued)

transmission between the network node and the wireless device based on the sent TA in Radio Resource Control, RRC, signaling.

12 Claims, 13 Drawing Sheets

(51) Int. Cl.
  *H04W 76/27* (2018.01)
  *H04W 68/00* (2009.01)
  *H04W 74/08* (2009.01)
(58) Field of Classification Search
  CPC ........... H04W 76/046; H04W 36/0055; H04W 76/19; H04W 76/38; H04W 88/02; H04W 88/08
  See application file for complete search history.

(56) References Cited

U.S. PATENT DOCUMENTS

| | | | |
|---|---|---|---|
| 2016/0309507 A1* | 10/2016 | Park | H04W 4/70 |
| 2017/0094711 A1* | 3/2017 | Hu | H04W 74/0833 |
| 2017/0135132 A1 | 5/2017 | Selvaganapathy | |
| 2020/0196379 A1* | 6/2020 | Park | H04W 76/27 |
| 2021/0352604 A1* | 11/2021 | Yang | H04W 56/005 |

OTHER PUBLICATIONS

Mediatek Inc., "Random Access Procedure for NB-IoT", 3GPP TSG-RAN2 #91 Bis Meeting, Malmo, SE, Oct. 5, 2015, pp. 1-6, R2-154462, 3GPP.

Sony, "Evaluation of Random Access Procedure in Solution 3", SA WG2 Meeting #111, Chengdu, CN, Oct. 19, 2015, pp. 1-6, S2-153557, 3GPP.

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 14)", Technical Specification, 3GPP TS 36.321 V14.3.0, Jun. 1, 2017, pp. 1-107, 3GPP.

3rd Generation Partnership Project, "3rd Generation Partnership Project; Technical Specification Group Radio Access Network; Evolved Universal Terrestrial Radio Access (E-UTRA); Multiplexing and Channel Coding (Release 14)", Technical Specification, 3GPP TS 36.212 V14.3.0, Jun. 1, 2017, pp. 1-198, 3GPP.

Wang, Y. et al., "A Primer on 3GPP Narrowband Internet of Things", IEEE Communication Magazine, vol. 55 No. 3, Mar. 13, 2017, pp. 117-123, IEEE.

Ericsson et al., "New WID on Even Further Enhanced MTC for LTE", 3GPP TSG RAN Meeting #75, Dubrovnik, Croatia, Mar. 6, 2017, pp. 1-4, RP-170732, 3GPP.

* cited by examiner

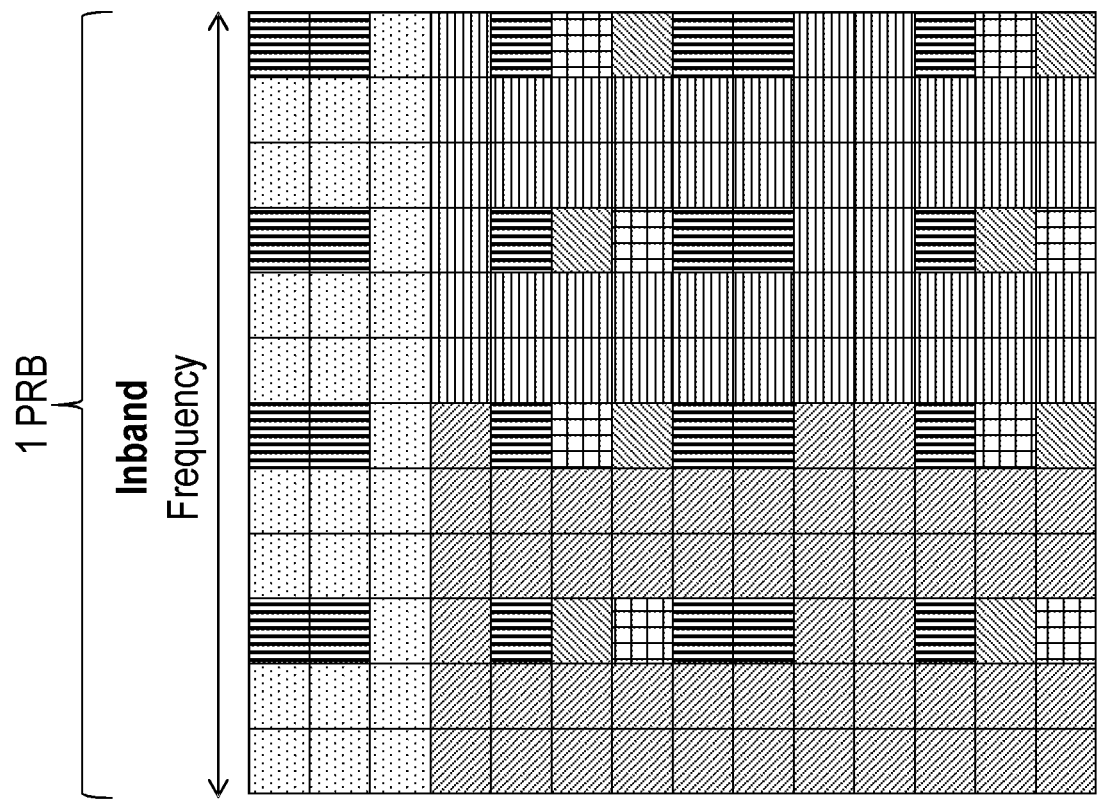
Fig. 1
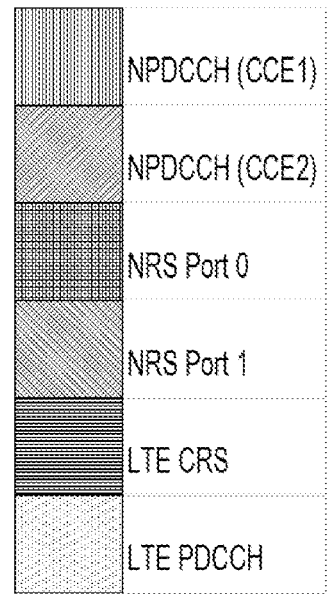

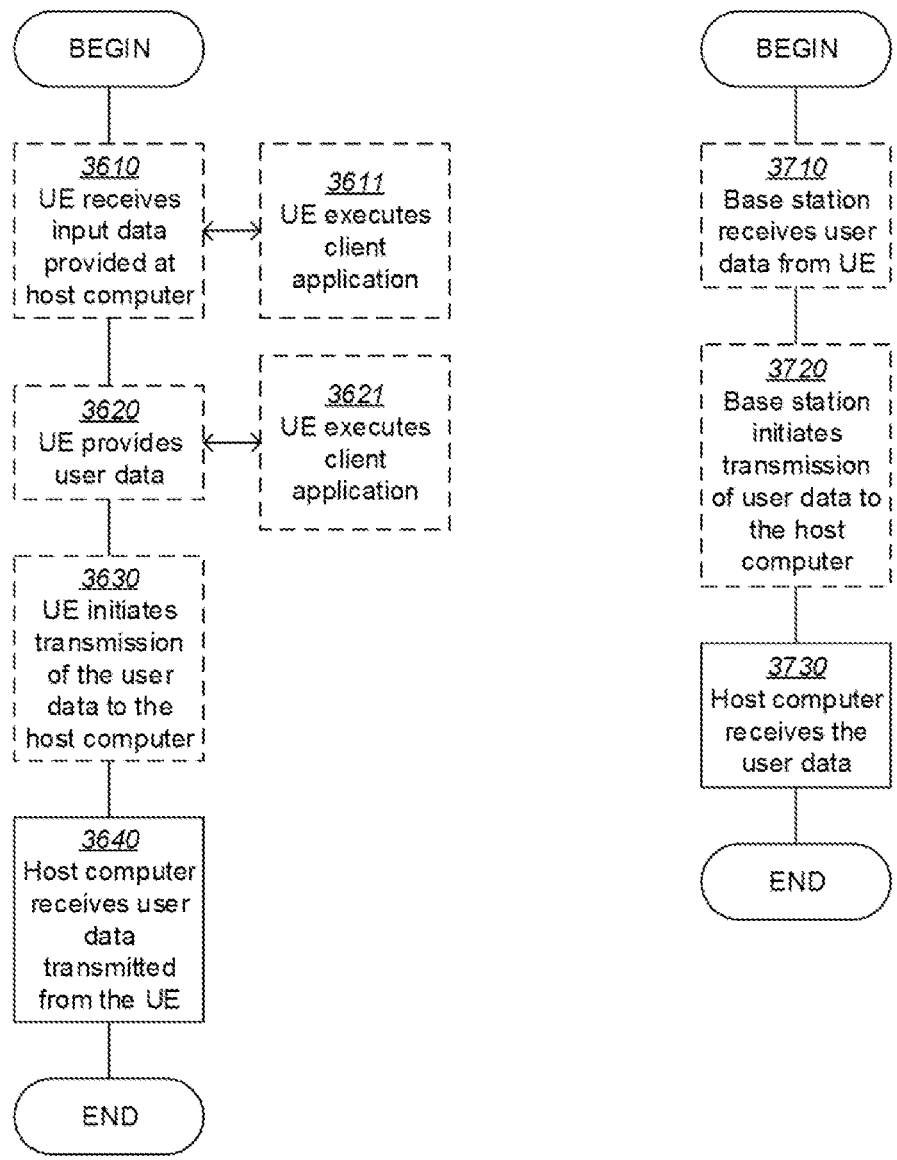

SYSTEMS AND METHODS FOR OBTAINING TIMING ADVANCES

TECHNICAL FIELD

Embodiments herein relate to a network node, a wireless device and methods therein. In some aspects, they relate to establishing a connection for data transmission between the network node and the wireless device 120 in a wireless communications network 100.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment. 3GPP Release-13 defines new Radio Access technology, named Narrow Band-Internet of things (NB-IoT). NB-IoT is primarily defined for low-throughput, delay-tolerant applications, such as meters and sensors. It enables data rate of just 10's of kbps with 180 kHz of bandwidth, and can provide deep coverage. NB-IoT may be deployed within an existing LTE band, in guard-band between two regular LTE carriers, or in standalone mode, which provides an easy migration path for the re-farmed GSM, 2:nd generation/General Packet Radio Services (2G/GPRS), spectrum.

NB-IoT technology occupies a frequency band of 180 kHz bandwidth, which corresponds to one resource block in LTE transmission. Due to the reduced channel band-width most physical channels have been redesigned: Narrowband Primary Synchronization Signal/Narrowband Secondary Synchronization Signal (NPSS/NSSS), Narrowband Physical Broadcast Channel (NPBCH), Narrowband Reference Signal (NRS), Narrowband (N) Physical Downlink Control Channel (PDCCH). See example of an NB-IoT Physical Resource Block (PRB) in FIG. 1, wherein the x axis represents time, and the Y axis represents Inband frequency, and wherein:

NPDCCH (CCE1) is marked by vertical stripes, wherein CCE1 is the Control Channel Elements.

NPDCCH (CCE2) is marked by to the right tilted diagonal stripes, wherein CCE2 is the Control Channel Elements.

NRS Port 0 is marked by squares,

NRS Port 1 is marked by to the left tilted diagonal stripes,

LTE Cell Specific Reference Signal (CRS) is marked by horizontal stripes, and

LTE Physical Downlink Control Channel (PDCCH) is marked by dots.

Different coverage extension levels of wireless devices have been defined to cope with different radio conditions. This relates link adaptation in the sense that different UEs are configured with different amounts of repetition for coverage extension. There are typically 3 Coverage Enhancement (CE) levels, CE level 0 to CE level 2. CE level 0 corresponds to normal coverage, CE level 1 and 2 corresponds to extended coverage regions. CE level 2 is the furthest extended coverage, where the coverage is assumed to be very poor. The main impact of the different CE levels is that messages between the wireless device and an access point have to be repeated several times especially for the CE 2, see RP-170732, "New WI on Further NB-IoT enhancements", RAN #75.

Some of the use cases that NB-IoT aims are:
Smart metering (electricity, gas and water)
Intruder alarms & fire alarms for homes & commercial properties
Smart city infrastructure such as street lamps or dustbins
Connected industrial appliances such as welding machines or air compressors.

SUMMARY

In many of the use cases, a majority of the wireless devises are going to be stationary, e.g., mounted into wall, or semi-stationary, e.g., sensors on the windows to determine when to open and close the windows. Release-15 enhancement work item of NB-IoT has introduced relaxed monitoring primarily attempted to save power consumption of the stationary or semi-stationary UEs with fixed geostationary position. The UEs are also referred to as wireless devises herein and can be read interchangeably. Thus, 3GPP standardization work is ongoing to optimize the performance of NB-IoT for the UE which are fixed and not moving.

NB-IoT devices may be located deep in the basement etc., thus needing extra power to send uplink data. A Preamble based Random Access (RA) procedure is a method where a UE grabs an UL channel to be used for sending a Radio Resource Control (RRC) Connection Request. One outcome of the RA procedure is to determine a Timing Advance (TA) value so that the UE can be synchronized when it sends its UL data. TA estimation is a complex procedure.

Timing advance, from the UE point of view, is a negative offset between the timing of the received DL subframe and its transmission of UL subframe. The UL of all the UEs should be aligned at the eNB receiver to reduce interference between different UEs. Due to propagation delays, the UE further away from the eNB should transmit earlier to ensure all the UL of all UEs received at the eNB are aligned. TA is used to control the UL Transmission timing of an Individual UE. When UE wish to establish RRC connection with eNB, it transmits a Random Access Preamble, eNB estimates the transmission timing adjustment for the UE required to receive the UL transmission in sync. Then eNB transmits a Random Access Response which comprises TA command, based on that UE adjusts the UE transmit timing.

An object of embodiments herein is to improve the process for establishing a connection for a data transmission a wireless communications network.

According to an aspect of embodiments herein, the object is achieved by a method performed by a network node for establishing a connection for data transmission between the network node and the wireless device in a wireless communications network. The network node establishes that the wireless device is fixed. Fixed comprises, e.g. means, always being served by the same one or more access points. The network node obtains a Timing Advance, TA, for transmissions between the network node and the wireless device. The obtaining of the TA is performed without UpLink, UL, transmission. The network node sends an indication to the wireless device, which indication indicates the obtained TA. The network node then establishes a connection for data transmission between the network node and the wireless device based on the sent TA in Radio Resource Control, RRC, signaling.

Radio Resource Control (RRC) signaling is a means of communication between a wireless device and a network node. The RRC protocol is a layer in the interface between the network node and the wireless device which is in charge of system information broadcast, establishment of connection and radio bearers, paging, mobility functions, configuration of security, configuration of QoS, device measurement reporting, etc.

According to another aspect of embodiments herein, the object is achieved by method performed by a wireless device for establishing a connection for data transmission between a network node and the wireless device in a wireless communications network. The wireless device is fixed, wherein fixed comprises always being served by the same one or more access points. The wireless device receives an indication from the network node. The indication indicates a TA. The TA is obtained without performing UL transmission. The wireless device performs RRC signaling with the network node using the indicated TA, and then establishes a connection for data transmission between the network node and the wireless device based on the RRC signaling.

According to a further aspect of embodiments herein, the object is achieved by a network node for establishing a connection for data transmission between the network node and the wireless device in a wireless communications network. The network node is configured to: Establish that the wireless device is fixed, wherein fixed comprises always being served by the same one or more access points, obtain a TA for transmissions between the network node and the wireless device, which obtaining of the TA is performed without UL transmission, send an indication to the wireless device, which indication indicates the obtained TA, and establish a connection for data transmission between the network node and the wireless device based on the sent TA in RRC signaling.

According to a further aspect of embodiments herein, the object is achieved by a wireless device for establishing a connection for data transmission between a network node and the wireless device in a wireless communications network. The wireless device is adapted to be fixed. Fixed comprises always being served by the same one or more access points. The wireless device is configured to: Receive an indication from the network node, which indication indicates a TA, and which TA is obtained without performing UL, transmission, perform RRC signaling with the network node 110 using the indicated TA, and establish a connection for data transmission between the network node 110 and the wireless device based on RRC signaling.

Since, when the network node has established that the wireless device is fixed, a TA for transmissions between the network node and the wireless device can be obtained without any UL transmission. This results in that a complex TA estimation procedure is not needed, which in turn improves the process for establishing a connection for a data transmission in the wireless communications network.

Further advantages of embodiments herein comprises at least:

Saving battery in the wireless device.
Saving network node processing capacity such as eNB processing Capacity.
Simplifying of wireless device and/or RAN procedures.

BRIEF DESCRIPTION OF THE FIGURES

FIG. 1 is a schematic diagram illustrating prior art.

FIGS. 12-15 are flowcharts illustrating methods implemented in a communication system including a host computer, a base station and a user equipment.

DETAILED DESCRIPTION

As a part of developing embodiments herein a problem will first be identified and discussed.

From the above use cases, it is evident that in most of the use cases, majority of the UEs are going to be stationary, e.g., mounted into wall, or semi-stationary (e.g., sensors on the windows to determine when to open and close the windows). Rel-15 enhancement work item of NB-IoT has introduced relaxed monitoring primarily attempted to save power consumption of the stationary or semi-stationary UEs with fixed geo-stationary position. Thus, 3gpp standardization work is ongoing to optimize the performance of NB-IoT for the UE which are fixed and not moving.

NB-IoT devices may be located deep in the basement etc., thus needing extra power to send uplink data. A Preamble based RA procedure is a method where a UE grabs an UL channel to be used for sending an RRC Connection Request. One outcome of the RA procedure is to determine a Timing Advance (TA) value so that the UE can be synchronized when it sends its UL data. TA estimation is a complex procedure.

Figure 7:
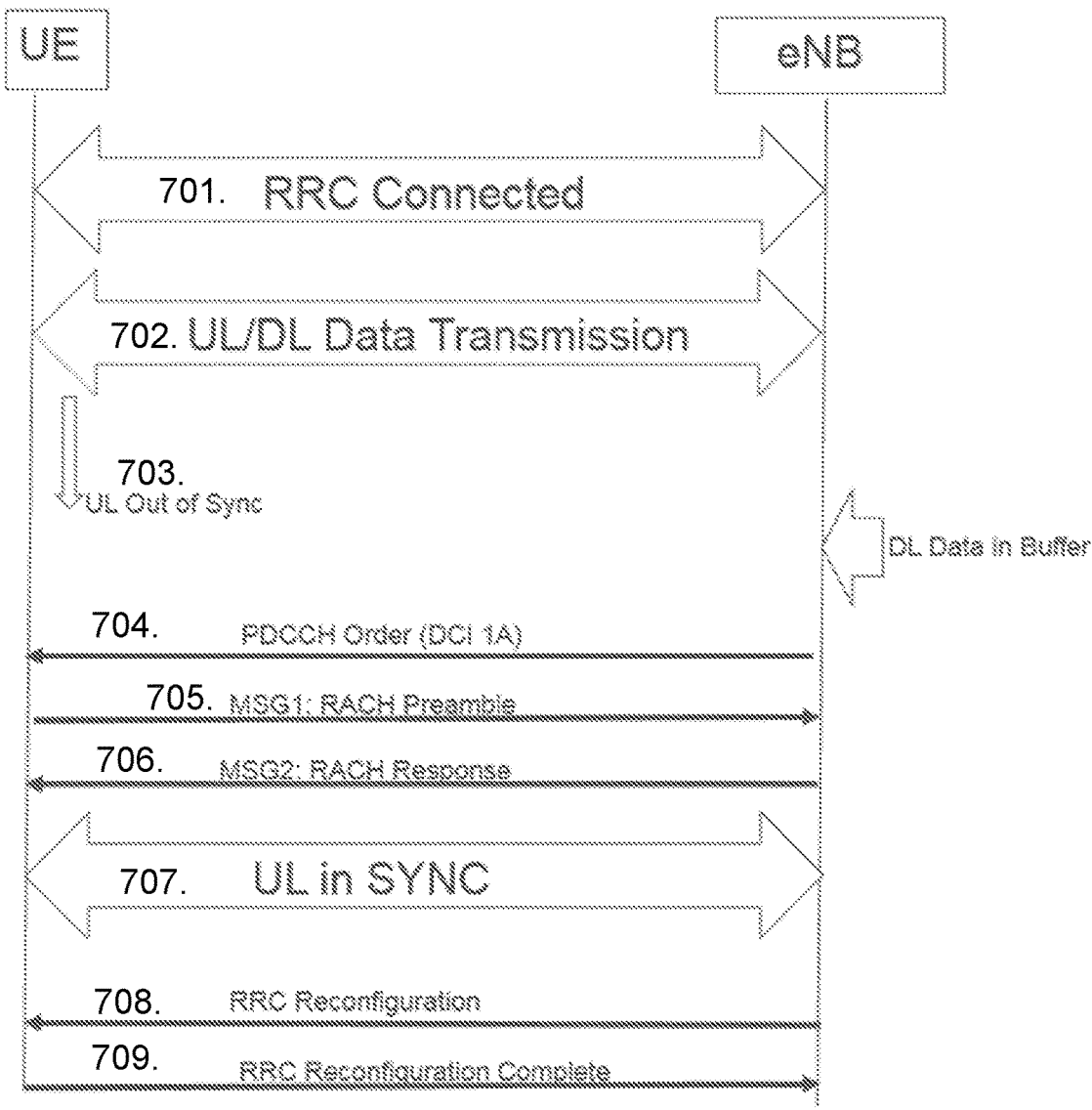
FIG. 7 is a signaling diagram illustrating prior art.

The process of a Contention free PDCCH-Ordered Physical Random Access Channel (PRACH) or NB-IoT PRACH (NPRACH) for NB-IoT UE for RRC Out of Sync according to prior art is shown in FIG. 7. The process comprises the following actions:

701. A UE such as a wireless device is RCC connected to a network node referred to as an eNB in FIG. 7.

702. UL and Downlink (DL) data transmissions are going on between the UE and the eNB.

703. The UE is considered to have lost uplink synchronization. If there is any DL data in a network node buffer, such as an eNB buffer that is to be sent, the UE first needs to be synchronized and therefore a TA is needed. Also for DL transmission valid TA is required e.g. for transmission of ACK.

704. The eNB therefore sends a PDCCH order whereby the UE is asked to perform preamble based RACH procedure to obtain the TA.

705. The UE then sends to the eNB, a RACH Preamble referred to as Message (Msg) 1. This means that UE has sent message to initiate connection with the network node.

706. The eNB responds to the UE with a RACH Response, referred to as Msg 2. This means that the eNB has detected some UE intended to access the network, and allocated resources and correct TA for the UE to continue with the random access procedures to access the network.

707. After receiving the RACH response the UL is in sync again.

708. The eNB then sends an RRC reconfiguration to the UE.

708. The UE sends an RRC reconfiguration complete to the eNB.

An object of embodiments herein is to improve the performance of a wireless communications network such as e.g. NB IoT, enhanced Machine-Type Communication (eMTC), or Long Term Evolution category M1 (Cat-M) network.

Embodiments herein immensely simplify the process by providing methods wherein TA is known in prior or is obtained in a simple way.

Embodiments herein may refer to NB-IoT, PDCCH Order, Random Access, Stationary UEs.

According to example scenario, when in connected mode, a TA timer, also referred to as timeAlignmentTimer, will eventually expire, at this point the UE such as a wireless device will be considered to have lost uplink synchronization. As mentioned above, if there is any DL data in a network node buffer, such as an eNB buffer that is to be sent, the wireless device first needs to be synchronized. However, according to embodiments herein, a preamble based RACH procedure to obtain the TA is not needed. Embodiments herein save wireless device power and network node processing capacity such as eNB processing capacity since a simplified or no RA procedure is provided. In a similar manner, embodiments herein provide knowing the TA prior to the access attempt in RRC_IDLE mode which is beneficial.

Figure 2:
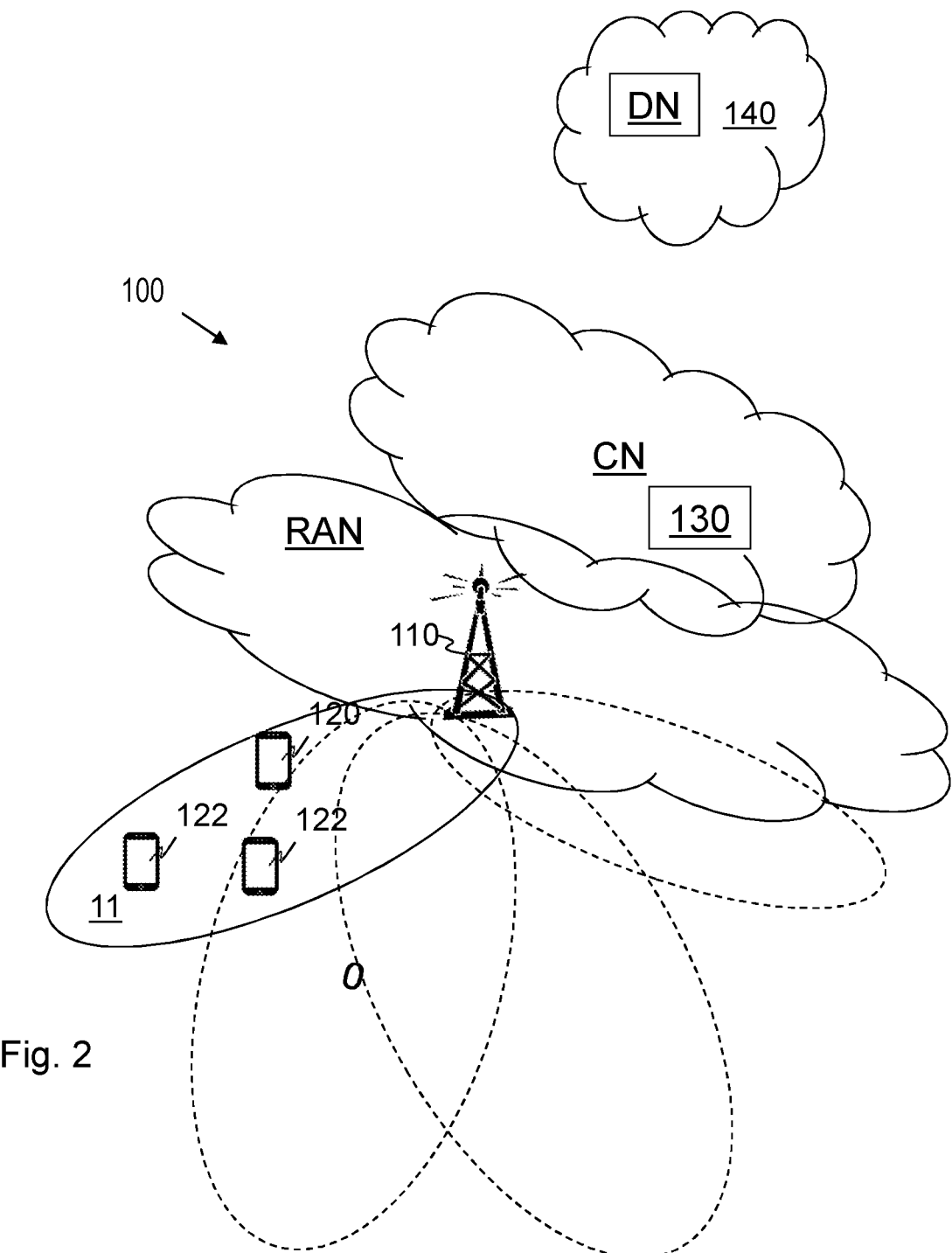
FIG. 2 is a schematic block diagram illustrating embodiments of a wireless communications network.

Embodiments herein relate to wireless communication networks in general. FIG. 2 is a schematic overview depicting a wireless communications network 100. The radio communications network 100 comprises one or more RANs and one or more CNs. The radio communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

In the wireless communication network 100, wireless devices e.g. a wireless device 120 also referred to as the first UE 120, is fixed and may be comprised in a group of fixed wireless devices comprising also some other wireless devices 122 also referred to a second wireless devices 122. The term fixed wireless device when used herein means that the wireless device 120, 122 always is served by the same one or more access points such as e.g. the same one or more cells, and this is also referred to as Stationary e.g., mounted into wall, or Semi-Stationary devices e.g., sensors on the windows to determine when to open and close the windows.

The wireless devices 120, 122 may each e.g. be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

Embodiments herein are mostly exemplified with NB-IoT devices but it may be applicable to other wireless devices which are served by other Radio Access technologies such as CAT-M, LTE, WiFi, or NR Carriers.

According to embodiments herein the wireless device 120 may be characterized by the below two properties.

a) The wireless device 120 is fixed such as e.g. Stationary or Semi-Stationary. The wireless device may be served by one fixed cell and/or always remaining in the same cell.

b) The wireless device 120 uses Periodic data generation, e.g. once per every hour, once per day or once per month.

The above properties may be used so that TA can be extracted in a simple way. Thus Random access procedure can be made void or TA calculation can be made void where applicable.

Network nodes operate in the radio communications network 100, such as a network node 110 also referred to as the first network node 110, providing radio coverage over a geographical area, a service area 11, which may also be referred to as a beam or a beam group of a first radio access technology (RAT), such as 5G, LTE, Wi-Fi, NB-IoT, CAT-M, Wi-Fi, eMTC or similar. The network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the radio access technology and terminology used. The network node 110 may be referred to as a serving radio network node and communicates with the wireless device 120, 122 with Downlink (DL) transmissions to the wireless device 120, 122 and Uplink (UL) transmissions from the wireless device 120, 122.

Further network nodes operate in the radio communications network 100, such as a network node 130 also referred to as the second network node 130. The network node 130 may be an MME which is a control node for an LTE access network, an Serving Gateway (SGW), and a Packet Data Network Gateway (PGW). An MME is amongst other responsible for tracking and paging procedure including retransmissions.

Methods according to embodiments herein may be performed by any of the network nodes 110, 130 such as e.g. an eNB or by the network node 130 such as e.g. an MME. Thus methods according to embodiments herein may be performed by the network node referred to as the network node 110, 130.

Methods e.g. for or establishing a connection for data transmission between the network node 110 and the wireless device 120 in the wireless communications network 110, are performed by the network node 110, 130. As an alternative, a Distributed Node DN and functionality, e.g. comprised in a cloud 140 as shown in FIG. 2 may be used for performing or partly performing the methods.

Actions of Some Embodiments Herein

Figure 3:
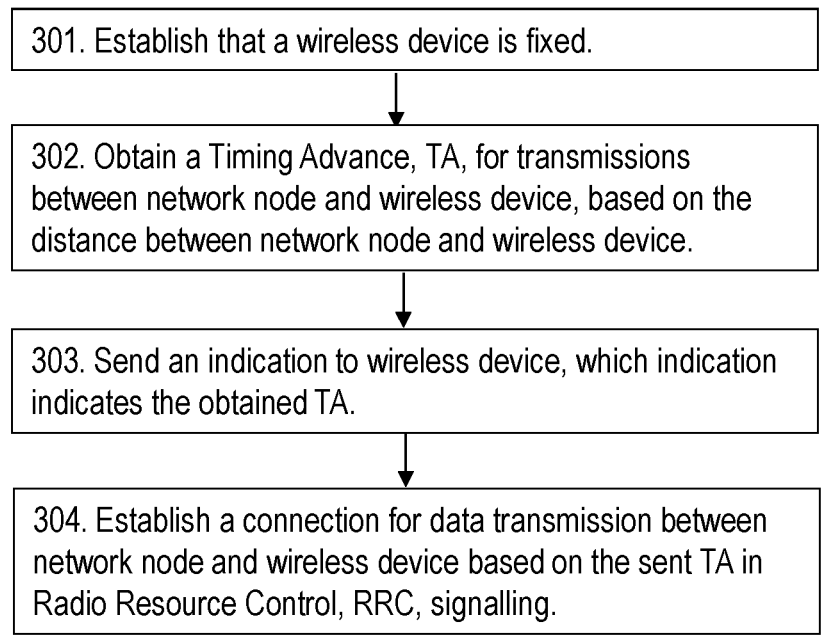
FIG. 3 is a flowchart depicting embodiments of a method in a network node.

Example embodiments of a flowchart depicting embodiments of a method performed by the network node 110, 130 e.g. for establishing a connection for data transmission between the network node 110 and the wireless device 120 in a wireless communications network 100 are depicted in FIG. 3 and will be described more in detail in the following. The method may comprise one or more of the following actions which actions may be taken in any suitable order.

The actions will first be described in short:

In action 301 the network node 110, 130 establishes that the wireless device 120 is fixed. To be fixed comprises to always be served by the same one or more access points such as e.g. the same one or more cells. This may be performed by the wireless device 120 letting the network node 130 such as e.g. an MME know in a Routing Area Update that it wants to perform relaxed measurement as it is stationary. The MME will grant the wireless device 120 to perform relaxed measurement and inform the network node 110 such as an eNB that the wireless device 120 is stationary.

In action 302 the network node 110, 130 obtains a Timing Advance (TA) for transmissions between the network node 110 and the wireless device 120. The obtaining of the TA is performed without UpLink (UL) transmission. This may be performed by calculating the distance when the position of the wireless device is known e.g. through positioning techniques such as GPS. The position of the wireless device 120 may be sent by the wireless device 120 to the network node 110.

In action 303 the network node 110, 130 sends an indication to the wireless device 120. The indication indicates the obtained TA. The TA will be used by the wireless device 120 for Radio Resource Control (RRC) signaling to the network node 110 performed to initiate a connection to the network node 110.

In action 304 the network node 110, 130 establishes the connection for data transmission between the network node 110 and the wireless device 120 based on the sent TA in RRC signaling.

Many NB-IoT use cases involves where the wireless device 120 is geographically fixed and shall be served by the same cell(s). Hence, embodiments herein may capitalize on this characteristics and simplify complex UE/RAN procedures.

According to an example scenario the fixed wireless device 120 is out of synchronization (sync) or in idle mode. Since there is data waiting to be sent between the network node 110 and the wireless device 120, a connection between the network node 110 and the wireless device 120 need to be established.

Action 301.

To be able to simplify the complex random access procedures, the network node 110 need to know whether the wireless device is fixed and if so, capitalize on this characteristics. The network node 110 thus establishes that the wireless device 120 is fixed. Fixed comprises always being served by the same one or more access points such as e.g. the same one or more cells. This establishment may be performed by obtaining the information from Core Network Nodes such as MME or HSS or may also be obtained from the wireless device 120.

The establishing that the wireless device 120 is fixed may further comprise establishing that the wireless device 120 is any one or more out of: An NB-IoT device, an eMTC device and a CAT-M device, a WiFi device, an LTE device and an NR device.

Action 302.

With the knowledge of that the wireless device 120 is fixed, it is possible to obtain TA in a simple way without performing any UL transmission. The network node 110 obtains a TA, e.g. an indication thereof. The obtained TA is for transmissions between the network node 110 and the wireless device 120. The obtaining of the TA is performed without UL transmission.

The indication may e.g. indicate that the previous TA is still valid. As an alternative, the TA may be based on the distance between the network node 110 and the wireless device 120. Since the wireless device 120 is fixed the TA can be determined only based on the distance. This means that TA may be assumed to be constant or not massive fluctuations, over a period of time.

In some embodiments, the wireless device 120 is comprised in a group of fixed wireless devices 120, 122. The group of fixed wireless devices 120, 122 may be a group of geostationary wireless devices 120, 122 that are near each other, i.e., they have the same TA values. In these embodiments, the TA value is applied to all the wireless devices in the group of fixed wireless devices 120, 122. I.e. the same TA value may be applied to all wireless devices 120, 122 within the group.

Action 303.

The wireless device needs to know the TA to be used in the transmission. The network node 110 thus sends an indication to the wireless device 120. The indication indicates the obtained TA.

In some embodiments, the wireless device 120 is comprised in a group of fixed wireless devices 120, 122. In these embodiments, the indication may further comprise an identity of the group of fixed wireless devices 120, 122.

The wireless device 120 may be of the kind that uses periodic data generation, e.g. once per every hour, once per day or once per month. In this case it is possible to preconfigure a set of parameters that may be utilized to optimize the resource consumption in the network node 110 once the wireless device 120 becomes active. Thus in some embodiments, the wireless device 120 sends data periodically. In these embodiments, the network node may be preconfigured with a set of parameters for the wireless device 120. The set of parameters may comprise any one or more out of: A Stationary or semi-stationary UE Identity (ID), a Group of stationary or semi-stationary UE, a Location TA, a Location cell, a Quality of Service (QoS) and/or a Priority, Time and/or Periodicity of Data, and a Dedicated Resource need for DL and/or UL.

In these embodiments, the sending of the indication to the wireless device 120 may further comprise sending a paging message to the wireless device 120. This is performed based on the preconfigured set of parameters in the network node 110, just before it is time for the wireless device 120 being in idle mode to become active and send UL data. This means that the network node 110 being preconfigured with the set of parameters knows the points in time the wireless device 120 is to send the periodic data from these set of parameters, and the network node 110 can thus send paging messages just before these points in time. The paging message includes which preamble resource to use, for a contention free RA for establishing the connection for data transmission between the network node 110 and the wireless device 120.

The paging message may further comprise, based on the preconfigured set of parameters in the network node 110, an UL grant and a Cell-Radio Network Temporary Identifier (C-RNTI). When this information is available to the wireless device 120, the wireless device basically has all the information available for sending msg3. Thus, msg1 and msg2 can be skipped. The word "skip" when used herein means "not perform" or "refrain from".

Action 304.

The network node 110 then establishes a connection for data transmission between the network node 110 and the wireless device 120 based on the sent TA in RRC signaling. In other words, the wireless device 120 uses the TA when performing RRC signaling to establish the connection. That is, the TA may be applied when the wireless device transmits RRCConnectionSetupRequest or RRCConnectionResumeRequest RRC message to set up an RRC connection.

In some embodiments, the establishing of the connection for data transmission between the network node 110 and the wireless device 120 is initiated without any preamble based RACH procedures.

Figure 4:
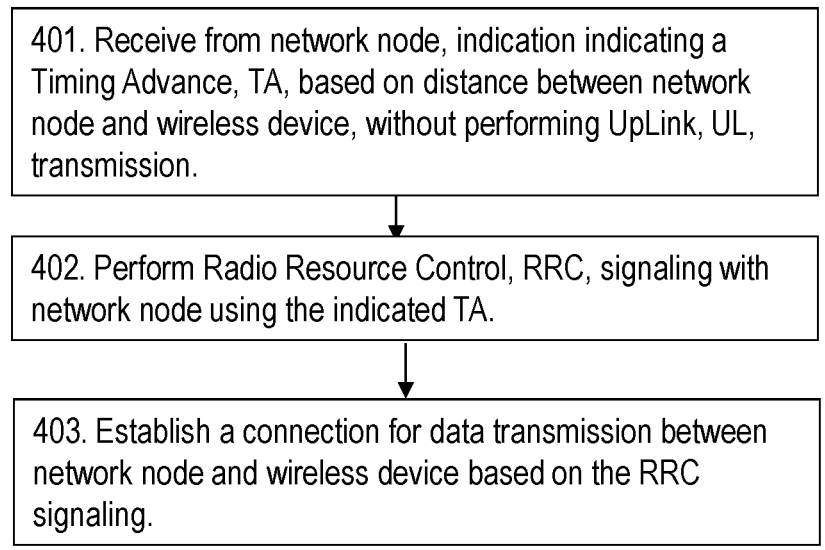
FIG. 4 is a flowchart depicting embodiments of a method in a wireless device.

The method described above from the view of the network node 110 will now be described from the view of the wireless device 120. Example embodiments of a flowchart depicting embodiments of a method performed by the wireless device 120, e.g. for establishing a connection for data transmission between the network node 110, 130 and the wireless device 120 in the wireless communications network 100 are depicted in FIG. 4 and will be described more in detail in the following. The wireless device 120 is fixed, which means that the wireless device 120 is always served by the same one or more access points such as e.g. the same one or more cells. The method may comprise one or more of the following actions which actions may be taken in any suitable order.

The actions will first be described in short:

In action 401 the wireless device 120 receives an indication from the network node 110, 130. The indication indicates a TA such as a TA value. The TA is obtained without performing UL transmission.

It should be noted that the terms "TA" and "TA value" may be used interchangeably in this document.

In action 402 the wireless device 120 performs Radio Resource Control, RRC, signaling with the network node 110 using the indicated TA.

In action 403 the wireless device 120 establishes a connection for data transmission between the network node 110 and the wireless device 120 based on RRC signaling.

Action 401.

The wireless device 120 receives the indication from the network node 110. The indication indicates a TA. As mentioned above, the TA may be based on the distance between the network node 110 and the wireless device 120, and which TA is obtained without performing UL transmission.

In some embodiments, the wireless device 120 sends data periodically. In these embodiments, the network node 110 may be preconfigured with a set of parameters for the wireless device 120. The set of parameters may comprise any one or more out of: A Stationary or semi-stationary UE Identity (ID), a Group of stationary or semi-stationary UE, a Location TA, a Location cell, a Quality of Service (QoS) and/or a Priority, Time and/or Periodicity of Data, and a Dedicated Resource need for DL and/or UL.

The network node 110 being preconfigured with the set of parameters knows the points in time the wireless device 120 is to send the periodic data from these set of parameters, and the network node 110 can thus send paging messages just before these points in time. Thus, based on the preconfigured set of parameters in the network node 110, just before it is time for the wireless device 120 being in idle mode to become active and send UL data, the wireless device 120 further receives from the network node 110 a paging message. The paging message includes which preamble resource to use, for a contention free Random Access for establishing the connection for data transmission between the network node 110 and the wireless device 120.

The paging message may further comprise an UL grant and a C-RNTI based on the preconfigured set of parameters in the network node 110.

Action 402.

The wireless device 120 performs RRC signaling with the network node 110 using the indicated TA. The wireless device 120 can skip sending msg1 and obtaining TA in msg2 as it already has TA.

Action 403.

The wireless device 120 then establishes a connection for data transmission between the network node 110 and the wireless device 120 based on RRC signaling.

The establishing of the connection for data transmission between the network node 110 and the wireless device 120 may be initiated without any preamble based RACH procedures.

Figure 5:
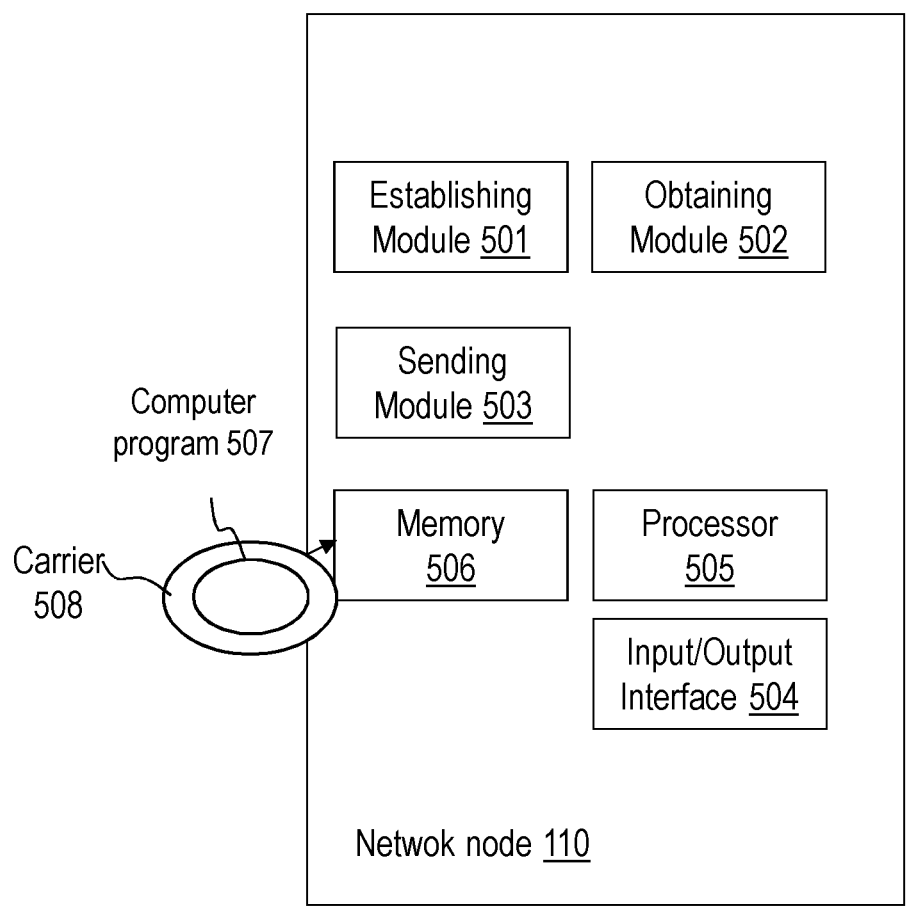
FIG. 5 is a schematic block diagram illustrating embodiments of a network node.

To perform the method actions e.g. for planning radio resources for transmissions, the network node 110, 130 may comprise the arrangement depicted in FIG. 5. The network node 110, 130 may e.g. comprise an establishing module 501, an obtaining module 502 and a sending module 503.

Those skilled in the art will also appreciate that the modules in the network node, 110, 130 described above may refer to a combination of analog and digital circuits, and/or one or more processors configured with software and/or firmware, e.g. stored in the network node, 110, 130, that when executed by the respective one or more processors such as the processors described above. One or more of these processors, as well as the other digital hardware, may be included in a single Application-Specific Integrated Circuitry ASIC), or several processors and various digital hardware may be distributed among several separate components, whether individually packaged or assembled into a system-on-a-chip SoC).

The network node 110, 130 may comprise an input and output interface 504 configured to communicate with the wireless device 120, 122. The input and output interface may comprise a wireless receiver not shown) and a wireless transmitter not shown).

The embodiments herein may be implemented through a respective processor or one or more processors, such as the processor 505 of a processing circuitry in the network node 110, 130 depicted in FIG. 5, together with respective computer program code for performing the functions and actions of the embodiments herein. The program code mentioned above may also be provided as a computer program product, for instance in the form of a data carrier carrying computer program code for performing the embodiments herein when being loaded into the network node 110, 130. One such carrier may be in the form of a CD ROM disc. It is however feasible with other data carriers such as a memory stick. The computer program code may furthermore be provided as pure program code on a server and downloaded to the network node 110, 130.

The network node 110, 130 may further comprise a memory 506 comprising one or more memory units. The memory 506 comprises instructions executable by the processor in network node 110, 130.

The memory 506 is arranged to be used to store e.g. data, configurations, and applications to perform the methods herein when being executed in the network node 110, 130.

In some embodiments, a respective computer program 507 comprises instructions, which when executed by the respective at least one processor 505, cause the at least one processor of the network node 110, 130 to perform the actions above.

In some embodiments, a respective carrier 508 comprises the respective computer program, wherein the carrier is one of an electronic signal, an optical signal, an electromagnetic signal, a magnetic signal, an electric signal, a radio signal, a microwave signal, or a computer-readable storage medium.

Figure 6:
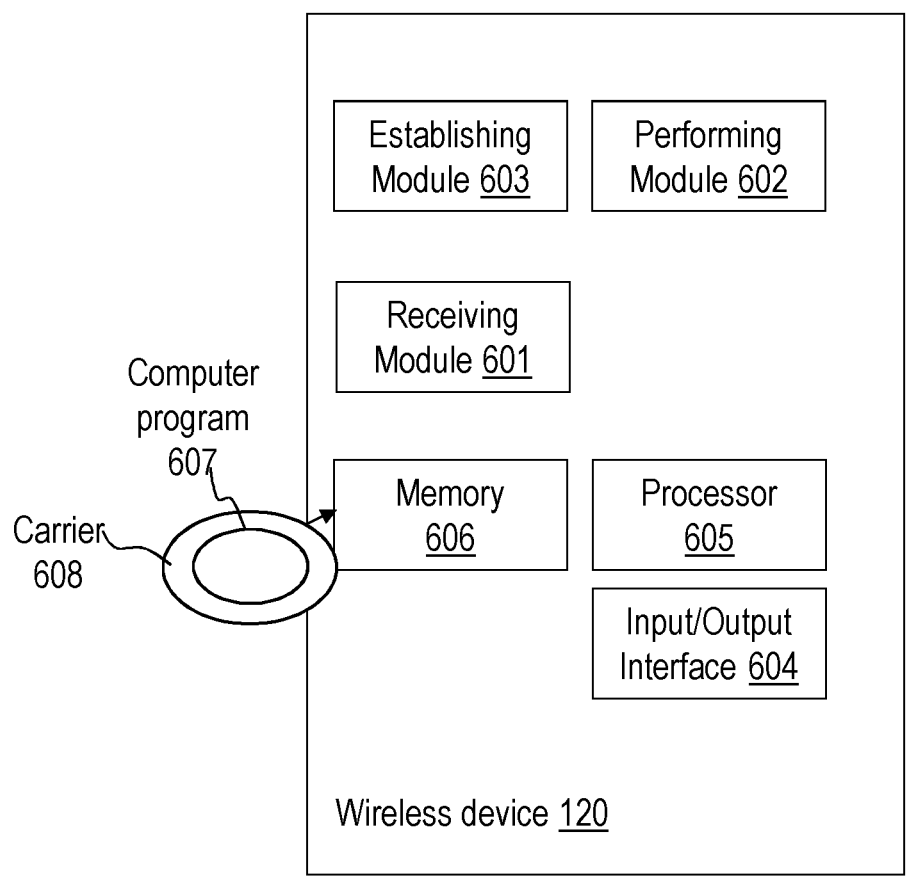
FIG. 6 is a schematic block diagram illustrating embodiments of a wireless device.

To perform the method actions e.g. for planning radio resources for transmissions, the network node 110, 130 may comprise the arrangement depicted in FIG. 6. The wireless device 120 may e.g. comprise an and a receiving module 601, a performing module 602, and an establishing module 603.

Those skilled in the art will also appreciate that the modules in the wireless device 120, described above may refer to a combination of analog and digital circuits, and/or one or more processors configured with software and/or firmware, e.g. stored in the wireless device 120, that when executed by the respective one or more processors such as the processors described above. One or more of these processors, as well as the other digital hardware, may be included in a single Application-Specific Integrated Circuitry ASIC), or several processors and various digital hardware may be distributed among several separate components, whether individually packaged or assembled into a system-on-a-chip SoC).

The wireless device 120 may comprise an input and output interface 604 configured to communicate with the network node 110. The input and output interface may comprise a wireless receiver not shown) and a wireless transmitter not shown).

The embodiments herein may be implemented through a respective processor or one or more processors, such as the processor 605 of a processing circuitry in wireless device 120 depicted in FIG. 6, together with respective computer program code for performing the functions and actions of the embodiments herein. The program code mentioned above may also be provided as a computer program product, for instance in the form of a data carrier carrying computer program code for performing the embodiments herein when being loaded into the wireless device 120. One such carrier may be in the form of a CD ROM disc. It is however feasible with other data carriers such as a memory stick. The computer program code may furthermore be provided as pure program code on a server and downloaded to the wireless device 120.

The wireless device 120 may further comprise a memory 606 comprising one or more memory units. The memory comprises instructions executable by the processor in wireless device 120.

The memory is arranged to be used to store e.g. data, configurations, and applications to perform the methods herein when being executed in the wireless device 120.

In some embodiments, a respective computer program 607 comprises instructions, which when executed by the respective at least one processor, cause the at least one processor of the wireless device 120 to perform the actions above.

In some embodiments, a respective carrier 608 comprises the respective computer program, wherein the carrier is one of an electronic signal, an optical signal, an electromagnetic signal, a magnetic signal, an electric signal, a radio signal, a microwave signal, or a computer-readable storage medium.

In the communications network 100 such as the NB-IoT there may be many use cases where the wireless device 120 is stationary, i.e. has a fixed geostationary position, e.g. is fixed to a wall. It should be noted that that the TA value may be determined by only the distance between the network node 110 such as an eNB and a wireless device 120. According to embodiments herein, for geostationary UEs such as the wireless device 120, the TA values may be computed or configure in the network node 110 such as the eNB for this sort of device in advance. For instance: TA may be estimated using positioning techniques such as GPS, OTDOA etc. According to some embodiments, the wireless device 120 may map its position to a TA value using a mapping of geographical position to TA which may be broadcasted in SI (System Information) and thus estimate TA without any UL transmission.

Also, in some advantageously embodiments, the network node 110 such as the eNB may estimate the TA only of one wireless device such as the wireless devices 120 among a group of geostationary wireless devices 122 that are near each other, (i.e., they have the same TA values, and apply the TA value to all the wireless devices 120, 122 in the group.

The TA may be stored in the network node 110 such as the eNB for this sort of fixed wireless devices 120, 122 so when a wireless device such as one of the wireless devices 122 is out of sync the same TA may be applied as for the wireless device 120.

The terms "wireless device 120" and "UE" may be used interchangeably in this document. Further, the terms "network node 110" and eNB may be used interchangeably in this document.

A) Contention free PDCCH-Ordered PRACH (or NPRACH for NB-IoT UE) for RRC Out of Synchronisation (Sync.)

Normal PDCCH ordered PRACH (or NPRACH for NB-IoT UE) according to prior art see 3GPP, 36.212ve30 "Multiplexing and channel coding", 2017 June, would be as illustrated in FIG. 7 which has been described above.

Figure 8:
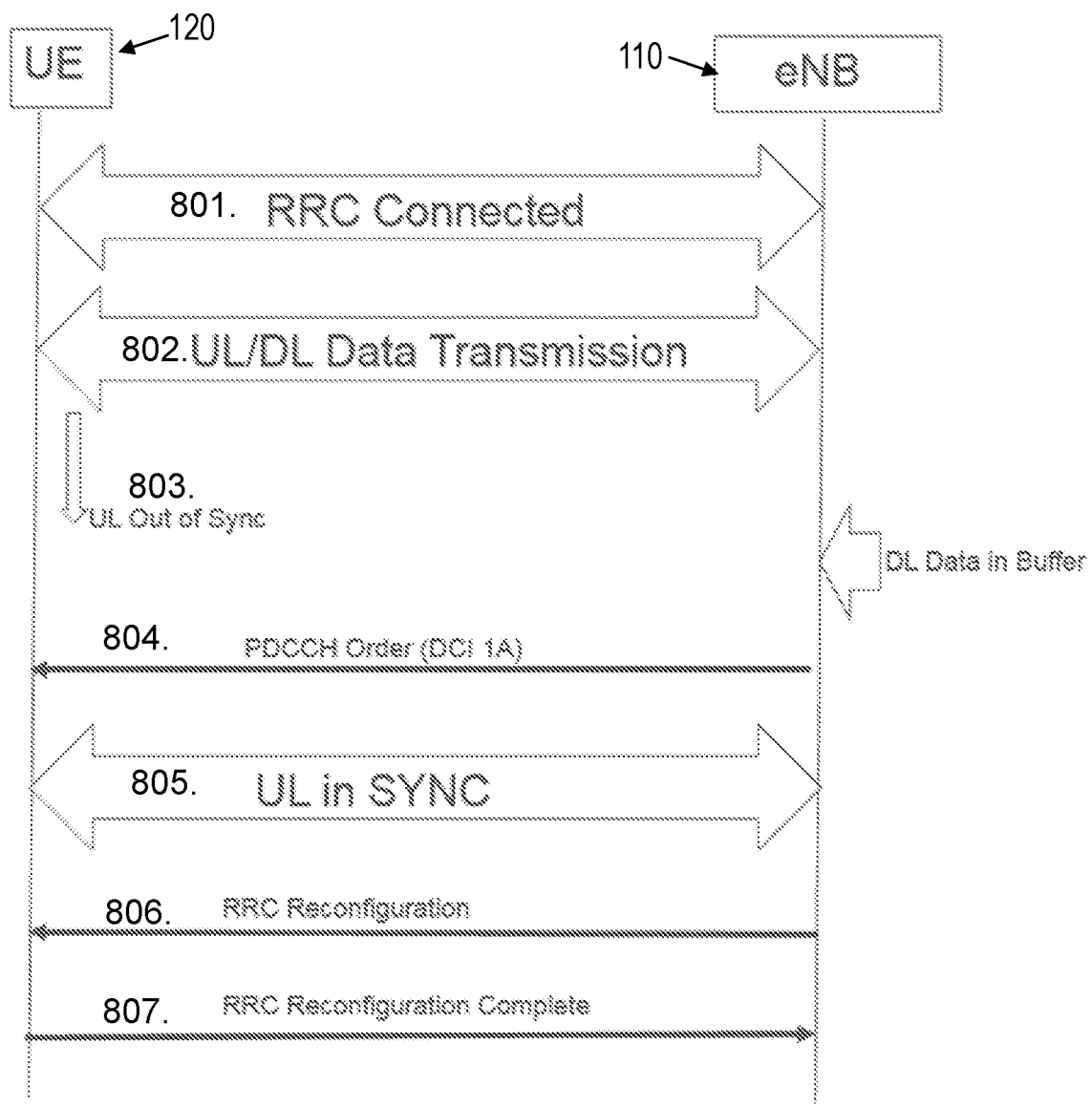
FIG. 8 is a signaling diagram illustrating embodiments herein.

However, according to embodiments herein, if TA is known the process may be simplified as shown in FIG. 8. The network node 110 is referred to as eNB 110 and the wireless device 120 is referred to as the UE 120 in this example and in FIG. 8. According to some example embodiments herein, PDCCH ordered PRACH (or NPRACH for the fixed UE 120 such as an NB-IoT UE), is performed to get a TA value, e.g. to Sync the UE 120, when a Time Alignment Timer, a.k.a timeAlignmentTimer, expires and there is data arrives in the buffer in the eNB 110 that needs to be sent to the UE 120. If TA is known prior, for the UE 120 which TA does not change the Synchronization may be achieved without complex timing alignment calculations.

801. The UE 120 is RCC connected to the eNB 110.

802. UL and Downlink (DL) data transmissions are going on between the UE 120 and the eNB 110.

803. The UE 120 is considered to have lost uplink synchronization. If there is any DL data in a buffer of the eNB 110 that is to be sent, the UE 120 first needs to be synchronized and therefore a TA is needed.

804. The eNB 110 therefore sends a PDCCH order and indicates that TA is still valid. Thus no Msg1 and Msg 2 are needed to be sent.

805. By means of the indication that TA still is valid, the UL synchronisation can be achieved again by using the previous TA. I.e. the TA that was used before UL out of sync.

806. The eNB 110 then sends an RRC reconfiguration to the UE 120.

807. The UE 120 sends an RRC reconfiguration complete to the eNB 110.

If it is known that the wireless device 120 is a geo-stationary device, also referred to as fixed wireless device the previous TA may still be applicable. Considering that the wireless device 120 was in connected state a short while prior, and has temporarily lost UL sync, the same TA may be applied. It would save UE power of the wireless device 120 and network node 110 processing capacity if the wireless device 120 does not need to re-initiate the preamble based random access procedure again. Thus, a simplified random access or random access less procedure, without msg1 and msg2, may be realized as can be seen from FIG. 8.

Thus, for geo-Stationary NB-IoT devices, a simplified random access mechanism is possible. It would save UE power and eNB processing capacity. Also, it would minimize the Contention based resolutions as there is no need to perform random access.

According to an example, a new DCI format for PDCCH order for stationary NB-IoT device is used which would include previously used TA value.

TA value still being valid may be indicated by the network node 110. According to some example embodiments herein wherein the fixed wireless device 120 is remaining in the same cell, the PDCCH ordered PRACH, or NPRACH if the wireless device 120 is an NB-IoT wireless device, for RRC out of sync, the NW such as the network node 110 may indicate that the previous TA value is still valid. Thus, synchronization can be achieved without complex timing alignment calculations.

TA value still being valid may be indicated by DCI. According to some example embodiments herein wherein the fixed wireless device 120 is remaining in the same cell, in the PDCCH order for RRC out of sync; the DCI used by the PDCCH ordered PRACH (or NPRACH if wireless device 120 is NB-IoT UE) may indicate that the previous TA value is still valid. Thus, Synchronization can be achieved without complex timing alignment calculations.

According to some example embodiments herein, the network such as the network node 110 may indicate that the previous TA value is still valid by using SI broadcast channel and/or dedicated RRC signally and/or by using DCI.

Similarly, if the wireless device 120 has to send any UL data after expiry of a timeAlignmentTimer, the wireless device 120 still needs to send the RACH preamble and the NW needs to sends the RACH response (NPRACH for NB-IoT); however the TA calculation may be simplified or made void by reusing the previous value.

B) Contention Free Random Access in Idle Mode

As mentioned above, for the fixed wireless device 120 such as e.g. a stationary/semi-stationary NB-IoT device that sends data periodically, e.g. once every hour, day, week etc. it is possible to preconfigure a set of parameters that may be utilized to optimize the resource consumption in the network node 110, 130 such as e.g. the eNB once the wireless device 120 becomes active.

The table below lists a few parameters that may be configured for the fixed wireless device 120. It also provides some examples of how the parameters may be set.

| Parameter | Stationary or semi-stationary UE ID | Group of stationary or semi-stationary UEs | Location (TA) Stored in Timing Advance unit | Location (cell) | QoS/ Priority (1 to 10) | Time and/or Periodicity of Data | Dedicated Resource need DL/UL (low 5 SF, medium 10 SF, high 20 SF) |
|---|---|---|---|---|---|---|---|
| Value (example) | IMSI | Stationary group 3 | 500 ms | Cell xx | 1 | 10:00AM and then every 1 hour | High/Low |

In the table above:

IMSI means International Mobile Subscriber Identity

SF means Subframes.

Figure 9:
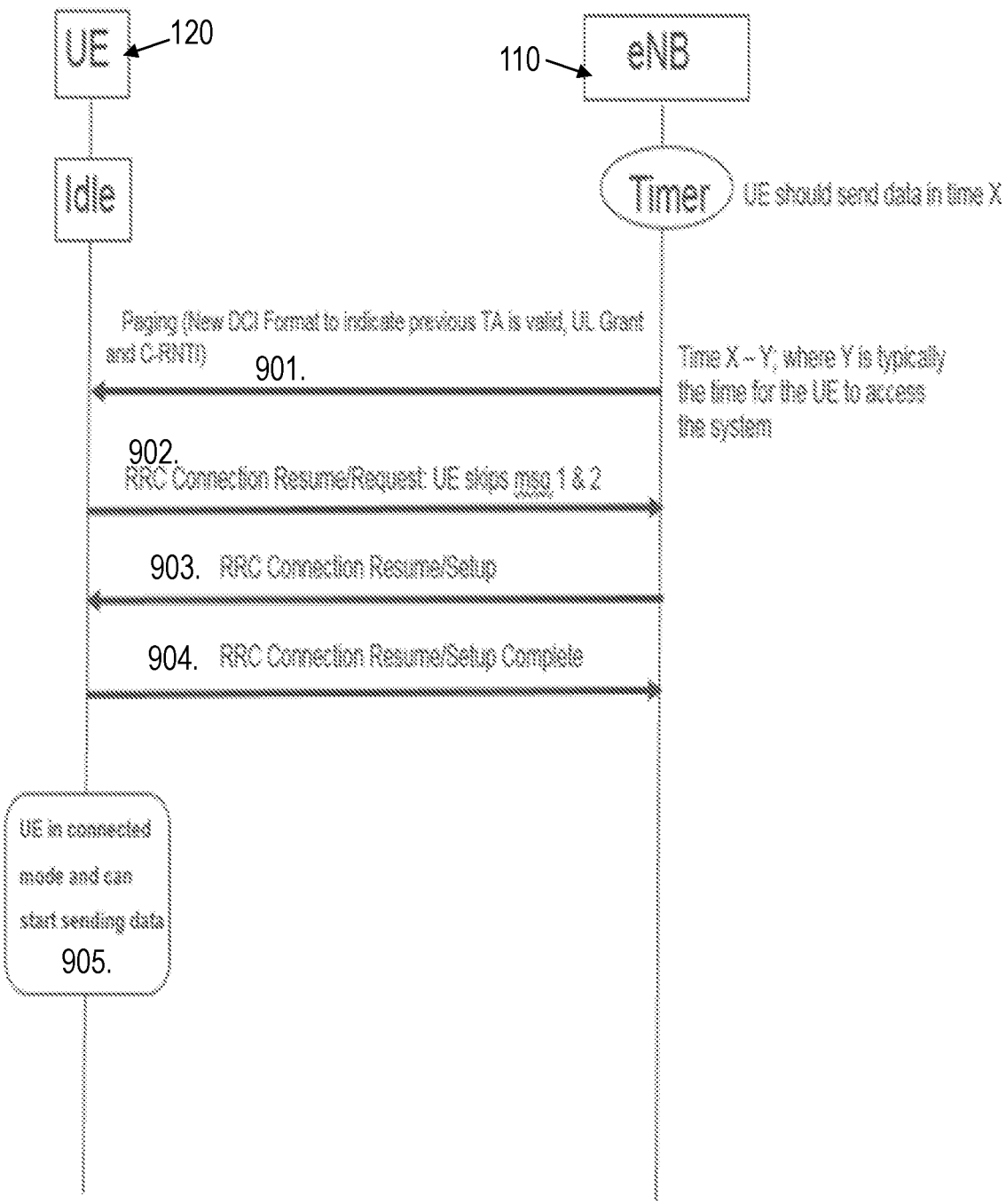
FIG. 9 is a signaling diagram illustrating embodiments herein.

In some of the embodiments, the initial wireless device 120 access or RRC connection resume may be initiated without any preamble based RACH procedures. See FIG. 9. I.e. the establishing of the connection for data transmission between the network node 110 and the wireless device 120 is initiated without any preamble based RACH procedures. The network node 110 is referred to as eNB 110 and the wireless device 120 is referred to as the UE 120 in this example and in FIG. 9.

901. The eNB 110 knows that it is time for the UE 120 to send UL data in time X based upon the configured information in the eNB 110, also referred to as the preconfigured set of parameters in the network node 110. In idle mode, just before it is time for the UE 120 to send an UL data, i.e. Time X−Y, where Y is typically the time for the UE 120 to access the system, the network node 110 such as the eNB may send a paging message to the wireless device 120. The paging message includes which preamble resource to use, for contention free Random Access. The paging message may e.g. be a normal paging message wherein which preamble to use is comprised in a DCI and/or a special paging message comprising a new DCI format. Similarly an UL grant and C-RNTI may be included in the paging message so that the wireless device 120 can skip random access procedure such as msg1 and msg2.

For DL case, it is simplified as the network node 110 such as the eNB does not need to keep track of when the wireless device 120 needs to send data in UL; thus, for the configured wireless device 120, the network node 110 such as the eNB 110 may page the wireless device 120 with the new PDCCH DCI format so that the wireless device 120 can skip msg1 & msg2.

902. UE 120 sends a Connection Resume Request to the eNB 110 and skips msg1 & 2. This is to resume the connection with the Network.

903. The eNB 110 then sends an RRC Connection Resume Setup message to the UE 120. This is to setup the connection with the UE 120.

904. The UE 120 responds by sending an RRC Connection Resume Setup Complete message to the UE 120. This is to inform the Network that the UE is in sync and it is now in connected state.

905. The UE 120 is then in connected mode and can start to send data.

An advantage with this example is that it can avoid complex procedure involved in msg1 and msg2.

Many NB-IoT use cases involves where the wireless device 120 is geographically fixed and shall be served by the same cell(s). Hence, embodiments herein may capitalize on this characteristics and simplify complex UE/RAN procedures.

Some example Embodiments numbered 1-14 are described below.

The following embodiments refer among other things to FIG. 2, FIG. 3, and FIG. 5.

Embodiment 1

A method performed by a network node, 110 for establishing a connection for data transmission between the network node 110 and the wireless device 120 in a wireless communications network 100, the method comprising:

establishing 301 that the wireless device 120 is fixed, wherein fixed comprises always being served by the same one or more access points such as e.g. the same one or more cells, obtaining 302 a Timing Advance, TA, e.g. an indication thereof, for transmissions between the network node 110 and the wireless device 120, based on the distance between the network node 110 and the wireless device 120, which obtaining of the TA is performed without UpLink, UL, transmission, sending 303 an indication to the wireless device 120, which indication indicates the obtained TA, establishing 304 a connection for data transmission between the network node 110 and the wireless device 120 based on the sent TA in Radio Resource Control, RRC, signaling.

Embodiment 2

The method according to embodiment 1, wherein the wireless device 120 is comprised in a group of fixed wireless devices 120, 122, and wherein the indication further comprises an identity of the group of fixed wireless devices 120, 122.

Embodiment 3

The method according to embodiment 2, wherein the TA value is applied to all the wireless devices in the group of fixed wireless devices 120, 122.

Embodiment 4

The method according to any of the embodiments 1-3, wherein establishing 301 that the wireless device 120 is fixed, further comprises establishing that the wireless device 120 is any one or more out of: an NB-IoT device, an eMTC device and a CAT-M device, a WiFi device, an LTE device and an NR device.

Embodiment 5

A computer program comprising instructions, which when executed by a processor, causes the processor to perform actions according to any of the embodiments 1-4.

Embodiment 6

A carrier comprising the computer program of embodiment 5, wherein the carrier is one of an electronic signal, an optical signal, an electromagnetic signal, a magnetic signal, an electric signal, a radio signal, a microwave signal, or a computer-readable storage medium.

Embodiment 7

A method performed by a wireless device, 120 for establishing a connection for data transmission between a network node 110 and the wireless device 120 in a wireless communications network 100, which wireless device 120 is fixed, wherein fixed comprises always being served by the same one or more access points such as e.g. the same one or more cells, the method comprising:

receiving 401 an indication from the network node 110, which indication indicates a Timing Advance, TA, which TA is based on the distance between the network node 110 and the wireless device 120, and which TA is obtained without performing UpLink, UL, transmission, performing 402 Radio Resource Control, RRC, signaling with the network node 110 using the indicated TA, and establishing 403 a connection for data transmission between the network node 110 and the wireless device 120 based on RRC signaling.

Embodiment 8

A computer program comprising instructions, which when executed by a processor, causes the processor to perform actions according to embodiment 7.

Embodiment 9

A carrier comprising the computer program of embodiment 8, wherein the carrier is one of an electronic signal, an optical signal, an electromagnetic signal, a magnetic signal, an electric signal, a radio signal, a microwave signal, or a computer-readable storage medium.

The following embodiments refer among other things to FIG. 2, FIG. 4 and FIG. 6.

Embodiment 10

A network node, 110 for establishing a connection for data transmission between the network node 110 and the wireless device 120 in a wireless communications network 100, the network node, 110 being configure to:

establish that the wireless device 120 is fixed, wherein fixed comprises always being served by the same one or more access points such as e.g. the same one or more cells, e.g. by means of an establishing module 501 in the network node, 110 obtain a Timing Advance, TA, e.g. an indication thereof, for transmissions between the network node 110 and the wireless device 120, based on the distance between the network node 110 and the wireless device 120, which obtaining of the TA is performed without UpLink, UL, transmission, e.g. by means of an obtaining module 502 in the network node, 110, send an indication to the wireless device 120, which indication indicates the obtained TA, e.g. by means of a sending module in the network node, 110, and establish a connection for data transmission between the network node 110 and the wireless device 120 based on the sent TA in Radio Resource Control, RRC, signaling e.g. by means of an establishing module 503 in the network node, 110.

Embodiment 11

The network node, 110 according to embodiment 10, wherein the wireless device 120 is adapted to be comprised in a group of fixed wireless devices 120, 122, and wherein the indication further comprises an identity of the group of fixed wireless devices 120, 122.

Embodiment 12

The network node, 110 according to embodiment 11, wherein the TA value is adapted to be applied to all the wireless devices in the group of fixed wireless devices 120, 122.

Embodiment 13

The network node, 110 according to any of the embodiments 10-12, wherein establish that the wireless device 120 is fixed, further is adapted to comprise establish that the wireless device 120 is any one or more out of: an NB-IoT device, an eMTC device and a CAT-M device, a WiFi device, an LTE device and an NR device.

Embodiment 14 The network node 110 may further be configured to initiate the establishing of the connection for data transmission between the network node 110 and the wireless device 120, without any preamble based RACH procedures e.g. by means of an establishing module 501 in the network node 110.

Embodiment 15

The wireless device 120 may be adapted to send data periodically. In these embodiments, the network node 110 may be preconfigured with a set of parameters for the wireless device 120.

Embodiment 16

The network node 110 may further be configured to: Based on the preconfigured set of parameters in the network node 110, just before it is time for the wireless device 120 being in idle mode to become active and send UL data, send to the wireless device 120 a paging message adapted to include which preamble resource to use for a contention free Random Access to establish the connection for data transmission between the network node 110 and the wireless device 120. e.g. by means of an sending module 503 in the network node 110.

Embodiment 17

The paging message may further be adapted to comprise, based on the preconfigured set of parameters in the network node 110: An UL grant and a Cell-Radio Network Temporary Identifier, C-RNTI. The Paging and DCI both may also be used such that Paging informs the UE about the start of Data Transmission and the other relevant information such as UL grant and C-RNTI etc is obtained from the DCI.

Embodiment 18

The set of parameters are adapted to comprise any one or more out of: Stationary or semi-stationary UE ID, Group of stationary or semi-stationary UE, Location TA, Location cell, QoS and/or Priority, Time and/or Periodicity of Data, and Dedicated Resource need DL/UL.

Embodiment 19

A wireless device, 120 for establishing a connection for data transmission between a network node 110 and the wireless device 120 in a wireless communications network 100, which wireless device 120 is adapted to be fixed, wherein fixed comprises always being served by the same one or more access points such as e.g. the same one or more cells, the wireless device, 120 being configured to:

receive an indication from the wireless device 120, which indication indicates a Timing Advance, TA, which TA is based on the distance between the network node 110 and the wireless device 120, and which TA is obtained without performing UpLink, UL, transmission, e.g. by means of a receiving module 601 in the wireless device, 120 perform Radio Resource Control, RRC, signaling with the network node 110 using the indicated TA, e.g. by means of a performing module 602 in the wireless device, 120, and establish a connection for data transmission between the network node 110 and the wireless device 120 based on RRC signaling e.g. by means of an establishing module 603 in the wireless device, 120.

Embodiment 20

The wireless device 120 may further be configured to initiate the establishing of the connection for data transmission between the network node 110 and the wireless device 120 without any preamble based RACH procedures. e.g. by means of the establishing module 603 in the wireless device 120.

Embodiment 21

The wireless device 120 may be adapted to send data periodically, and the network node 110 may be adapted to be preconfigured with a set of parameters for the wireless device 120. In these embodiments, the wireless device 120 may further be configured to: Based on the preconfigured set of parameters in the network node 110, just before it is time for the wireless device 120 being in idle mode to become active and send UL data, receive from the network node 110 a paging message including which preamble resource to use for a contention free Random Access to establish the connection for data transmission between the network node 110 and the wireless device 120, e.g. by means of the sending module 601 in the wireless device 120.

Embodiment 22

The paging message further is adapted to comprise, based on the preconfigured set of parameters in the network node 110: An UL grant and a Cell-Radio Network Temporary Identifier, C-RNTI.

Embodiment 23

The set of parameters are adapted to comprise any one or more out of: Stationary or semi-stationary UE ID, Group of stationary or semi-stationary UE, Location TA, Location cell, QoS and/or Priority, Time and/or Periodicity of Data, and Dedicated Resource need DL/UL.

Embodiment 24

A network node 110 for establishing a connection for data transmission between the network node 110 and the wireless device 120 in a wireless communications network 100, the network node, the network node 110 comprising a processor 505 and a memory 506 containing instructions executable by the processor 505 whereby the network node 110 is configured to:

establish that the wireless device 120 is fixed, wherein fixed comprises always being served by the same one or more access points such as e.g. the same one or more cells, e.g. by means of an establishing module 501 in the network node, 110 obtain a Timing Advance, TA, e.g. an indication thereof, for transmissions between the network node 110 and the wireless device 120, based on the distance between the network node 110 and the wireless device 120, which obtaining of the TA is performed without UpLink, UL, transmission, e.g. by means of an obtaining module 502 in the network node, 110 send an indication to the wireless device 120, which indication indicates the obtained TA, e.g. by means of a sending module in the network node, 110, and establish a connection for data transmission between the network node 110 and the wireless device 120 based on the sent TA in Radio Resource Control, RRC, signaling e.g. by means of an establishing module 503 in the network node, 110.

Embodiment 25

The network node, 110 according to embodiment 24, wherein the network node 110 further is configured to initiate the establishing of the connection for data transmission between the network node 110 and the wireless device 120, without any preamble based RACH procedures.

Embodiment 26

The network node 110 according to any of the embodiments 24-25, wherein the wireless device 120 is adapted to send data periodically, and wherein the network node 110 further is preconfigured with a set of parameters for the wireless device 120.

Embodiment 27

The network node 110 according to embodiment 26, wherein the network node 110 further is configured to:

based on the preconfigured set of parameters in the network node 110, just before it is time for the wireless device 120 being in idle mode to become active and send UL data, send to the wireless device 120 a paging message adapted to include which preamble resource to use for a contention free Random Access to establish the connection for data transmission between the network node 110 and the wireless device 120.

Embodiment 28

The network node 110 according to embodiment 26, the paging message further is adapted to comprise, based on the preconfigured set of parameters in the network node 110:

an UL grant and a Cell-Radio Network Temporary Identifier, C-RNTI.

Embodiment 29

The network node 110 according to any of the embodiments 24-28, wherein the set of parameters are adapted to comprise any one or more out of: [page 13, table]

Stationary or semi-stationary User Equipment, UE, Identity, ID,

Group of stationary or semi-stationary UE,

Location TA,

Location cell,

QoS and/or Priority,

Time and/or Periodicity of Data, and

Dedicated Resource need DownLink, DL,/UL

Embodiment 30

The network node 110 according to any of the embodiments 24-29, wherein the wireless device 120 is adapted to be comprised in a group of fixed wireless devices 120, 122, and wherein the indication further comprises an identity of the group of fixed wireless devices 120, 122.

Embodiment 31

The network node 110 according to embodiment 30, wherein the TA value is adapted to be applied to all the wireless devices in the group of fixed wireless devices 120, 122.

Embodiment 32

The network node 110 according to any of the embodiments 24-31, wherein establish that the wireless device 120 is fixed, further is adapted to comprise establish that the wireless device 120 is any one or more out of: an NB-IoT device, an eMTC device and a CAT-M device, a WiFi device, an LTE device and an NR device.

Embodiment 33

The network node 110 according to any of the embodiments 24-32, further being configured to obtain the TA for transmissions between the network node 110 and the wireless device 120 based on the distance between the network node 110 and the wireless device 120.

Embodiment 34

A wireless device, 120 for establishing a connection for data transmission between a network node 110 and the wireless device 120 in a wireless communications network 100, which wireless device 120 is adapted to be fixed, wherein fixed comprises always being served by the same one or more access points such as e.g. the same one or more cells, the wireless device 120 comprising a processor 605 and a memory 606 containing instructions executable by the processor 605 whereby the wireless device 120 is configured to:

receive an indication from the wireless device 120, which indication indicates a Timing Advance, TA, which TA is based on the distance between the network node 110 and the wireless device 120, and which TA is obtained without performing UpLink, UL, transmission, e.g. by means of a receiving module 601 in the wireless device, 120 perform Radio Resource Control, RRC, signaling with the network node 110 using the indicated TA, e.g. by means of a performing module 602 in the wireless device, 120, and establish a connection for data transmission between the network node 110 and the wireless device 120 based on RRC signaling e.g. by means of an establishing module 603 in the wireless device, 120.

Embodiment 35 1. The wireless device 120 according to embodiment 34, further being configured to initiate the establishing of the connection for data transmission between the network node 110 and the wireless device 120 without any preamble based RACH procedures.

Embodiment 36

The wireless device, 120 according to any of the embodiments 34-35, wherein the wireless device 120 is adapted to send data periodically, and wherein the network node 110 is adapted to be preconfigured with a set of parameters for the wireless device 120, [page 13, lines 9-13] and wherein the wireless device 120 further is configured to:

based on the preconfigured set of parameters in the network node 110, just before it is time for the wireless device 120 being in idle mode to become active and send UL data, receive from the network node 110 a paging message including which preamble resource to use for a contention free Random Access to establish the connection for data transmission between the network node 110 and the wireless device 120. [page 13, lines 19-23]

Embodiment 37

The wireless device, 120 according to embodiment 36, wherein the paging message further is adapted to comprise, based on the preconfigured set of parameters in the network node 110:

an UL grant and a Cell-Radio Network Temporary Identifier, C-RNTI

Embodiment 38

The wireless device, 120 according to any of the embodiments 34-37, wherein the set of parameters are adapted to comprises any one or more out of:

Stationary or semi-stationary User Equipment, UE, Identity, ID,

Group of stationary or semi-stationary UE,

Location TA,

5. Location cell,

QoS and/or Priority,

Time and/or Periodicity of Data, and

Dedicated Resource need DownLink, DL,/UL

Embodiment 39

The wireless device, 120 according to any of the embodiments 34-38, wherein TA is adapted to be based on the distance between the network node 110 and the wireless device 120.

Further Extensions and Variations

Figure 10:
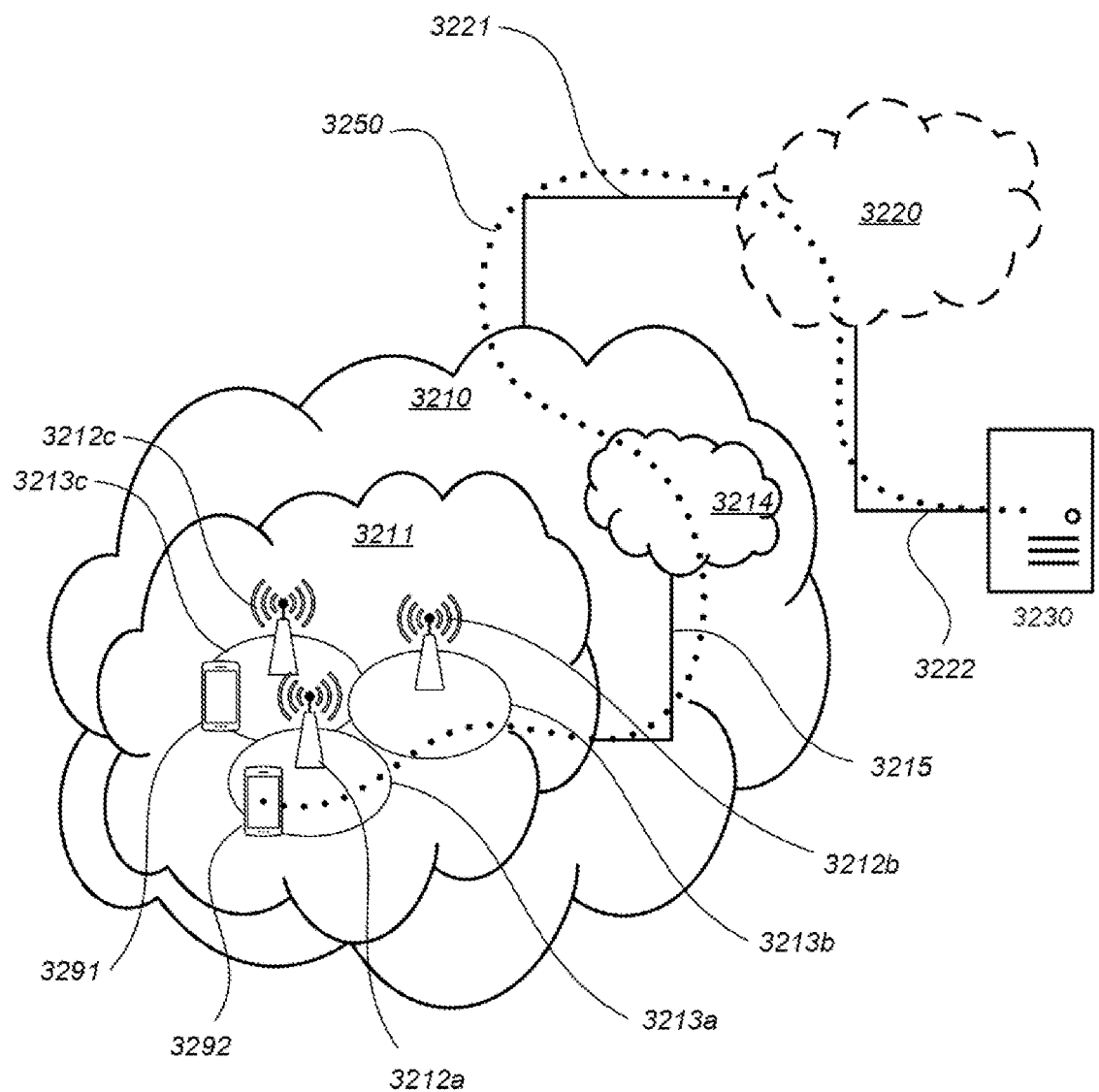
FIG. 10 schematically illustrates a telecommunication network connected via an intermediate network to a host computer.

With reference to FIG. 10, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, 130, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the wireless device 120 such as a Non-AP STA 3291 located in coverage area 3213*c* is configured to wirelessly connect to, or be paged by, the corresponding base station 3212*c*. A second UE 3292 e.g. the wireless device 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
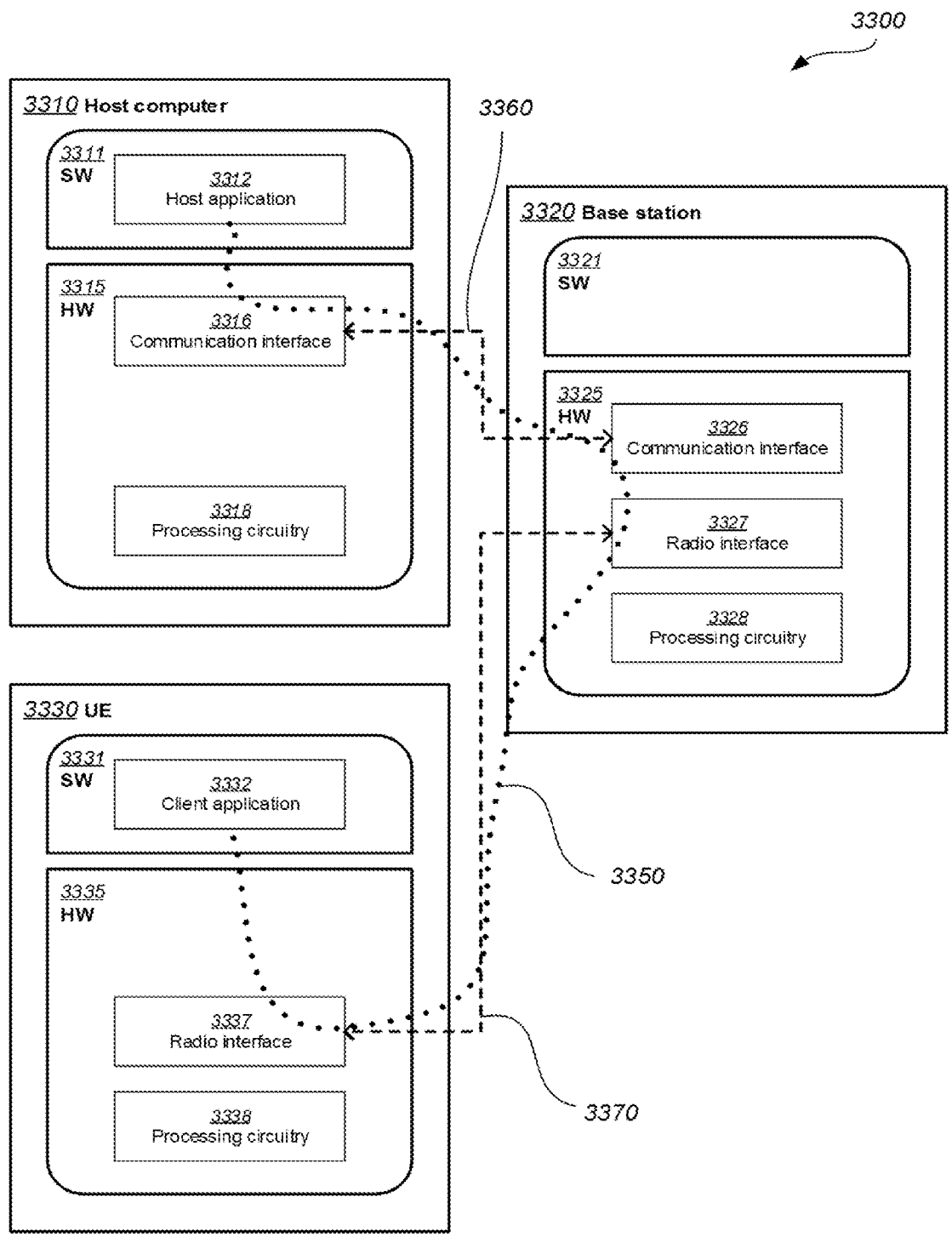
FIG. 11 is a generalized block diagram of a host computer communicating via a base station with a user equipment over a partially wireless connection.
Figures 12, 13:
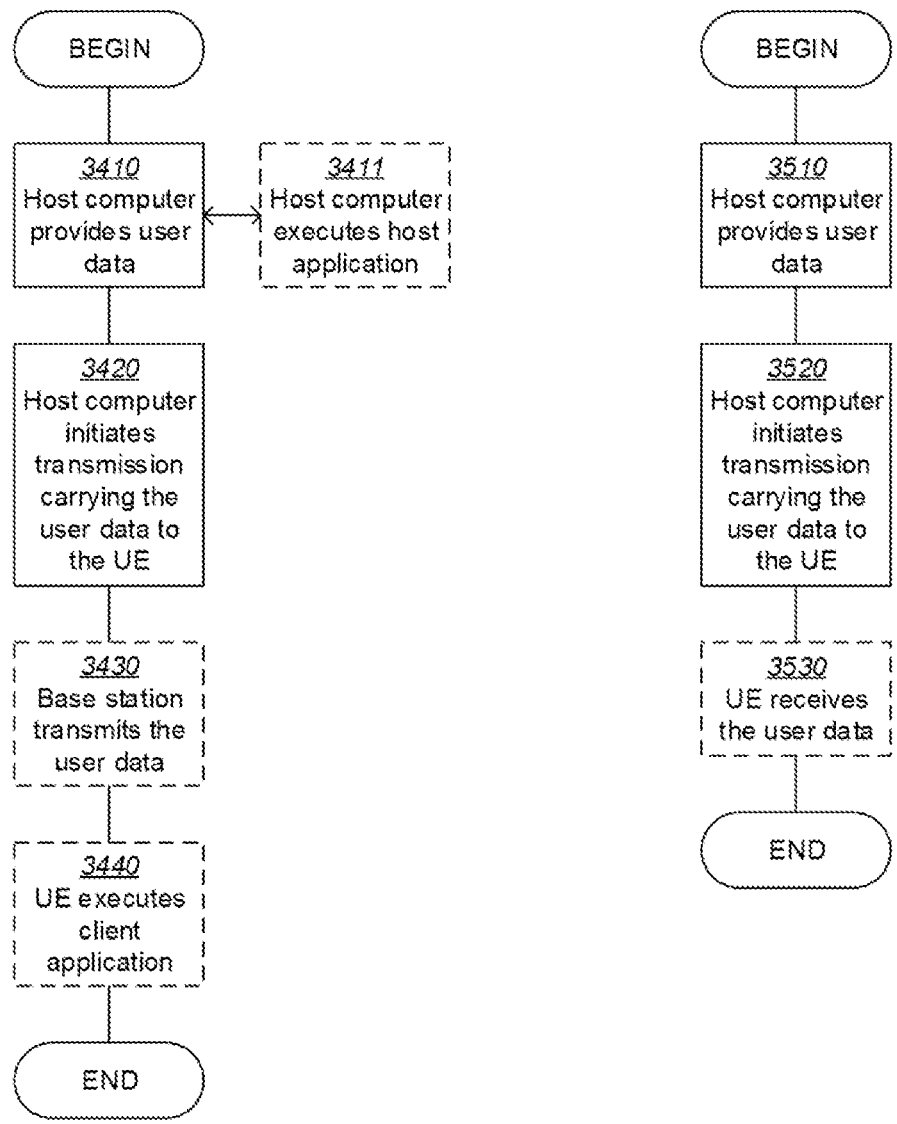

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 12, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station such as the network node 110, and a UE such as the wireless device 120, which may be those described with reference to FIG. 10 and FIG. 11. For simplicity of the present disclosure, only drawing references to FIG. 12 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 13 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 14 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 15 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| TA | Timing Advance |
| RA | Random Access |
| CE | Coverage Enhancement |
| IoT | Internet of things |
| UL/DL | Uplink/Downlink |

The invention claimed is:

1. A method, performed by a network node, for establishing a connection for data transmission between the network node and a wireless device in a wireless communications network, the method comprising the network node:

establishing that the wireless device is fixed, the wireless device being fixed meaning the wireless device is always being served by the same one or more access points, establishing that the wireless device is fixed comprising obtaining information from a core network node or the wireless device that the wireless device is fixed;

obtaining a Timing Advance (TA) for transmissions between the network node and the wireless device, the obtaining of the TA being performed without Uplink (UL) transmission and the obtained TA being based on a distance between the network node and the wireless device, the wireless device comprised in a group of fixed wireless devices that are within a predetermined proximity of each other, the TA being applied to all wireless devices within the group;

sending an indication to the wireless device that indicates the obtained TA; and establishing the connection for data transmission between the network node and the wireless device based on the sent TA, in Radio Resource Control (RRC) signaling, the establishing of the connection for data transmission between the network node and the wireless device initiated without any preamble based Random Access Channel (RACH) procedures.

2. The method of claim 1:
wherein the wireless device sends data periodically; wherein the network node is preconfigured with a set of parameters for the wireless device; and wherein the sending the indication to the wireless device comprises sending, based on the preconfigured set of parameters in the network node and just before it is time for the wireless device being in idle mode to become active and send UL data, a paging message to the wireless device, the paging message including which preamble resource to use for a contention free Random Access for establishing the connection for data transmission between the network node and the wireless device.

3. The method of claim 2, wherein the paging message comprises an UL grant and a Cell-Radio Network Temporary Identifier (C-RNTI) based on the preconfigured set of parameters in the network node.

4. A method, performed by a wireless device, for establishing a connection for data transmission between a network node and the wireless device in a wireless communications network; the wireless device being fixed, the wireless device being fixed meaning the wireless device is always being served by the same one or more access points; the method comprising the wireless device:
indicating that the wireless device is fixed, the indicating comprising one of indicating to a core network node that the wireless device is fixed by requesting to perform relaxed measurements and indicating to the network node the wireless device is fixed;
receiving an indication from the network node indicating a Timing Advance (TA), the TA being obtained without performing Uplink (UL) transmission, and the TA being based on a distance between the network node and the wireless device, the wireless device comprised in a group of fixed wireless devices that are within a predetermined proximity of each other, the TA being applied to all wireless devices within the group;
performing Radio Resource Control (RRC) signaling with the network node using the indicated TA; and
establishing the connection for data transmission between the network node and the wireless device based on RRC signaling, the establishing of the connection for data transmission between the network node and the wireless device initiated without any preamble based Random Access Channel (RACH) procedures.

5. The method of claim 4:
wherein the wireless device sends data periodically; wherein the network node is preconfigured with a set of parameters for the wireless device; wherein receiving an indication from the network node comprises receiving from the network node, based on the preconfigured set of parameters in the network node and just before it is time for the wireless device being in idle mode to become active and send UL data, a paging message including which preamble resource to use for a contention free Random Access for establishing the connection for data transmission between the network node and the wireless device.

6. The method of claim 5, wherein the paging message comprises an UL grant and a Cell-Radio Network Temporary Identifier (C-RNTI) based on the preconfigured set of parameters in the network node.

7. A network node adapted to establish a connection for data transmission between the network node and a wireless device in a wireless communications network, the network node comprising:
processing circuitry; memory containing instructions executable by the processing circuitry whereby the network node is operative to:
establish that the wireless device is fixed, the wireless device being fixed means the wireless device is always being served by the same one or more access points, establishing that the wireless device is fixed comprising obtaining information from a core network node or the wireless device that the wireless device is fixed;
obtain a Timing Advance (TA) for transmissions between the network node and the wireless device, the obtaining of the TA being performed without Uplink (UL) transmission, the obtained TA for transmissions between the network node and the wireless device being based on the distance between the network node and the wireless device, the wireless device comprised in a group of fixed wireless devices that are within a predetermined proximity of each other, the TA being applied to all wireless devices within the group;
send an indication to the wireless device indicating the obtained TA; and
establish the connection for data transmission between the network node and the wireless device based on the sent TA, in Radio Resource Control (RRC) signaling, the instructions being such that the network node is operative to initiate the establishing of the connection for data transmission between the network node and the wireless device without any preamble based Random Access Channel (RACH) procedures.

8. The network node of claim 7:
wherein the network node is preconfigured with a set of parameters for the wireless device; wherein the instructions are such that the network node is operative to:
send data periodically; and send a paging message to the wireless device based on the preconfigured set of parameters in the network node and just before it is time for the wireless device being in idle mode to become active and send UL data, the paging message including which preamble resource to use for a contention free Random Access to establish the connection for data transmission between the network node and the wireless device.

9. The network node of claim 8, wherein the paging message comprises an UL grant and a Cell-Radio Network Temporary Identifier (C-RNTI) based on the preconfigured set of parameters in the network node.

10. A wireless device adapted to establish a connection for data transmission between a network node and the wireless device in a wireless communications network, the wireless device being adapted to be fixed, the wireless device being fixed meaning the wireless device is always being served by the same one or more access points, the wireless device comprising:
processing circuitry; memory containing instructions executable by the processing circuitry whereby the wireless device is operative to:
indicate that the wireless device is fixed, the indicating comprising one of indicating to a core network node that the wireless device is fixed by requesting to perform relaxed measurements and indicating to the network node the wireless device is fixed; receive an indication from the network node indicating a Timing Advance (TA) which is obtained without performing Uplink (UL) transmission, the TA being based on a distance between the network node and the wireless device, the wireless device comprised in a group of fixed wireless devices that are within a predetermined proximity of each other, the TA being applied to all wireless devices within the group; perform Radio Resource Control (RRC) signaling with the network node using the indicated TA; and establish the connection for data transmission between the network node and the wireless device based on RRC signaling, the instructions being such that the wireless device is operative to initiate the establishing of the connection for data transmission between the network node and the wireless device without any preamble based Random Access Channel (RACH) procedures.

11. The wireless device of claim 10:
wherein the network node is adapted to be preconfigured with a set of parameters for the wireless device; wherein the instructions are such that the wireless device is operative to:
send data periodically; and receive a paging message from the network node based on the preconfigured set of parameters in the network node and just before it is time for the wireless device being in idle mode to become active and send UL data, the paging message including which preamble resource to use for a contention free Random Access to establish the connection for data transmission between the network node and the wireless device.

12. The wireless device of claim 11, wherein the paging message comprises an UL grant and a Cell-Radio Network Temporary Identifier (C-RNTI) based on the preconfigured set of parameters in the network node.

* * * * *